United States Patent [19]
Hong

[11] Patent Number: 6,027,022
[45] Date of Patent: Feb. 22, 2000

[54] QUALITY CONTROL APPARATUS AND METHOD USING A BAR CODE DATA ENTRY SYSTEM

[75] Inventor: Yu-Pyo Hong, Kyungki-do, Rep. of Korea

[73] Assignee: SamSung Electronics Co., Ltd., Kyungki-do, Rep. of Korea

[21] Appl. No.: 08/885,738

[22] Filed: Jun. 30, 1997

[30] Foreign Application Priority Data

Jun. 29, 1996 [KR] Rep. of Korea ...................... 96-25832

[51] Int. Cl.[7] ...................................................... G06K 7/10
[52] U.S. Cl. ................................. 235/462.01; 364/468.16
[58] Field of Search .................................... 235/385, 375, 235/376, 462.01; 364/468.16, 468.17, 468.22, 468.23

[56] References Cited

U.S. PATENT DOCUMENTS

| | | | |
|---|---|---|---|
| 4,682,261 | 7/1987 | Benson et al. ........................... | 364/468 |
| 4,833,306 | 5/1989 | Milbrett ................................... | 235/375 |
| 4,850,104 | 7/1989 | Matrone et al. ........................... | 29/829 |
| 4,945,216 | 7/1990 | Tanabe et al. ...................... | 235/462.15 |
| 4,956,783 | 9/1990 | Teranishi et al. ........................ | 364/468 |
| 5,015,832 | 5/1991 | Filipski et al. ...................... | 235/462.01 |
| 5,077,674 | 12/1991 | Tischler et al. ......................... | 364/468 |
| 5,086,397 | 2/1992 | Schuster et al. ......................... | 364/468 |
| 5,088,045 | 2/1992 | Jshimanaka et al. ................... | 364/468 |
| 5,159,180 | 10/1992 | Feiler ..................................... | 235/375 |
| 5,229,584 | 7/1993 | Erickson ................................. | 235/375 |
| 5,231,271 | 7/1993 | Hino et al. .............................. | 235/375 |
| 5,231,585 | 7/1993 | Kobayashi et al. ..................... | 364/468 |
| 5,296,688 | 3/1994 | Hamilton et al. ....................... | 235/375 |
| 5,319,454 | 6/1994 | Schutte ...................................... | 348/55 |
| 5,325,582 | 7/1994 | Glaser et al. ............................. | 29/840 |
| 5,434,792 | 7/1995 | Saka et al. .............................. | 364/468 |
| 5,461,570 | 10/1995 | Wang et al. ............................ | 364/468 |
| 5,491,637 | 2/1996 | Kraemer et al. ........................ | 364/468 |
| 5,493,106 | 2/1996 | Hunter .................................... | 235/375 |
| 5,555,504 | 9/1996 | Lepper et al. .......................... | 364/552 |
| 5,570,293 | 10/1996 | Tanaka et al. ..................... | 364/468.28 |
| 5,586,038 | 12/1996 | Nagaoka ............................ | 364/468.01 |
| 5,642,307 | 6/1997 | Jernigan ................................. | 365/103 |

*Primary Examiner*—Donald Hajec
*Assistant Examiner*—Diane I. Lee
*Attorney, Agent, or Firm*—Robert E. Bushnell, Esq.

[57] ABSTRACT

A quality control method and apparatus using a bar code data entry system that improves product quality through collection and processing of accurate information in real time by entering the production particulars from a manufacturing process to a sending-out process with the bar code system and storing them in a system control computer so as to prevent defective products from being sent out and avoid repetitive occurrences of the same failure. The bar code system is installed in the production line so as to immediately suspend the production line in case of a situation corresponding to production line stop conditions, thereby preventing repetitive occurrences of the same failure and sending-out of numerous defective products even after some with defects have been sent.

13 Claims, 8 Drawing Sheets

FAILURE AND REPAIR PARTICULARS

| INSPECTOR | | FAILURE NAME | REPAIR PARTICULARS | REPAIRMAN | | INSPECTOR | |
|---|---|---|---|---|---|---|---|
| MONTH | DAY | | | MONTH | DAY | MONTH | DAY |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

FIG. 1A

HISTORY CARD

| SET | MODEL NAME : |
|---|---|
| | SERIAL NO : |

| ASS'Y | MODEL NAME : |
|---|---|
| | SERIAL NO : |

| CHECKING SITUATION | | | | |
|---|---|---|---|---|
| DIVIDE | CHECKING ITEMS | | MONTH | DAY | INSPECTOR |
| P | CHECK WITH NAKED-EYE | | | |
| B | BOARD TEST | | | |
| A | OPERATION TEST 1 | | | |
| | OPERATION TEST 2 | | | |
| FINISHED | OPERATION TEST | A | | |
| | | B | | |
| | AGING TEST | | | |
| SENDING OUT | INTERNAL TEST | | | |
| | PERFORMANCE TEST | | | |
| | APPEARANCE TEST | | | |

FIG. 1B

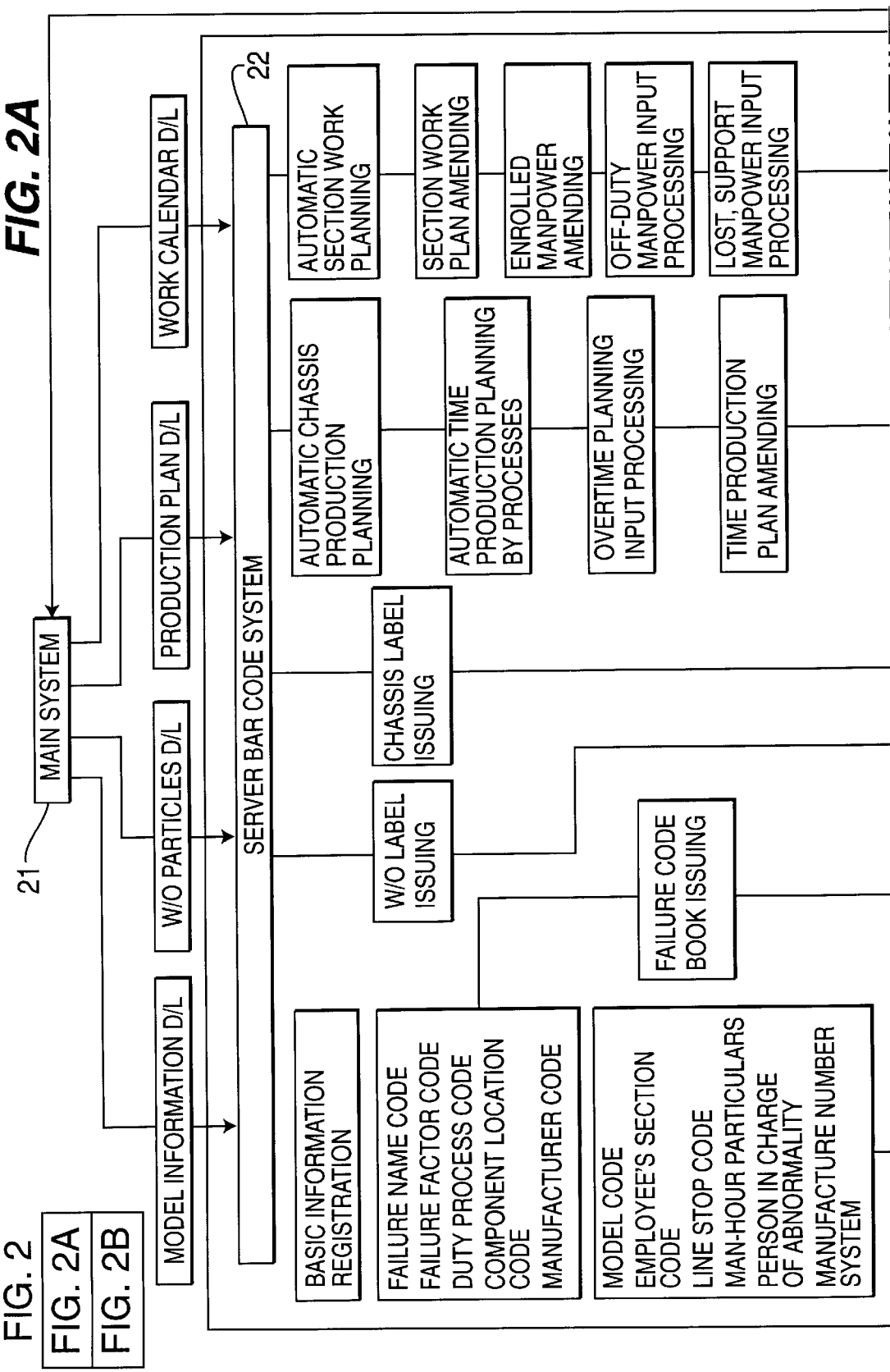

QUALITY CONTROL APPARATUS AND METHOD USING A BAR CODE DATA ENTRY SYSTEM

CLAIM OF PRIORITY

This application makes reference to, incorporates the same herein, and claims all benefits accruing under 35 U.S.C. § 119 from an application for QUALITY CONTROL SYSTEM USING BAR CODE SYSTEM AND METHOD OF THE SAME earlier filed in the Korean Industrial Property Office on Jun. 29, 1996 and there duly assigned Serial No. 1996-25832, a copy of which application was annexed to the U.S. application.

BACKGROUND OF THE INVENTION

1. Field of the Invention

The present invention relates to a quality control apparatus and method using a bar code data entry system. More particularly, this invention relates to such an apparatus and method in which production data from all phases of the production process, from manufacturing through shipment of finished production units, are entered into a production information system through a bar code data entry system. The production information system stores production history data for each individual production unit as it progresses through the production process. The production information system also analyzes this data on a real-time basis to identify the existence and sources of production problems, such as recurrent defects arising from errors in the production process. Real-time analysis of production history data for individual production units enables the production facility's process engineering team to prevent shipment of defective units and to increase production efficiency by identifying and eliminating the sources of recurrent defects before numerous defective units have been produced. The present invention therefore improves product quality and production efficiency through the collection, processing, and analysis of accurate production information in real time.

2. Discussion of the Related Art

Successful manufacturing concerns have realized that they must apply their utmost energy and ingenuity to the problems of improving product quality and production efficiency if they expect to compete in the contemporary commodities markets. In the technology sector, in particular, these markets are characterized by fierce competition among producers and increasingly sophisticated expectations by consumers. Survival in this brisk environment demands that manufacturers simultaneously pursue development of advanced technology, minimize every controllable cost factor, and create new products and product features to anticipate evolving consumer preferences. Integrated manufacturing information systems have become essential tools for firms to successfully meet these challenges.

Advanced production information systems process and communicate large amounts of information of widely diverse types, often collected at a variety of locations and from numerous sources, with the objective of providing practical solutions to critical production issues. But a serial paradigm for data collection, defect analysis, and solution implementation cannot provide the proactive methodologies required to optimize dynamic manufacturing environments and thereby to maintain a competitive position in the contemporary marketplace. The reason is evident: effective production analysis requires compilation of production histories for at least a representative sample of individual production units. Also, each such history must include complete and accurate data on the specific defects found in the production unit and when those defects were first detected. But when production defects are identified in individual units of a product only after the units have been completed and placed in service, it becomes exceedingly difficult to analyze the defects and trace them back to their probable sources at the various stages of the production process.

Real-time collection and analysis of production data has become a central issue in the design of modem industrial information systems. On the other hand, real-time data collection is particularly difficult to carry out in the context of general manufacturing operations. This difficulty arises from the requirement for effective real-time analysis that data collection be rapid and substantially error-free. Conventional quality control systems, in contrast, have relied upon manual recordation and encoding of production data prior to analysis by the information system. Manual entry of data into the computer's database degrades the effectiveness of automated production analysis for two basic reasons. First, data thus entered unavoidably contains encoding errors, whether from miskeying of the data codes or from misinterpretation or simple loss of the information to be encoded. Second, manual data entry creates an inherent processing bottleneck in the analysis process because human operators cannot achieve data entry rates even approaching those of automated encoding systems. These dual aspects of the data entry problem are exacerbated when the personnel performing the data entry also have primary responsibility for generating the information to be encoded, as is the case in efficient test and inspection situations.

Automated data input, to accelerate data entry and prevent data loss and encoding errors, therefore offers a potentially important key to solving the problem of real-time production analysis. Various approaches have been proposed to automate production data entry, including using computer keyboards, optical card readers, and magnetic cards. The basic weakness of manual data entry persists in these methods, though, because they all depend upon human operators to translate specific facts from a human-intelligible form into machine-readable code. That is, these existing data entry approaches still carry the disadvantage of requiring human operators to generate computer-readable codes representative of the information to be entered. Voice recognition systems have recently been suggested as a potential alternative, but their effectiveness has not yet been demonstrated.

Effective automated data entry methodologies therefore constitute a primary objective for the next generation of manufacturing information systems. A radical approach, which has yielded some benefit in a limited range of specialized application areas, focuses on eliminating human error by eliminating human involvement in the data collection process. For the present and the foreseeable future, however, no automated system can approach the capacity of human technicians to continuously adapt their operations to complex and rapidly evolving manufacturing environments and to draw subtle but important distinctions between similar fact situations presented by those environments. To eliminate human involvement in data collection is therefore to sacrifice the unique advantages provided by human perception to identify and distinguish defect conditions.

A variety of systems have been proposed to integrate more effectively production personnel and production information systems. U.S. Pat. Nos. 5,088,045 and 5,586,038, for example, both disclose production management systems that include scanning bar coded identification labels to input production unit serial numbers or model numbers into the system's computer. But the former relies on automatic sensors to detect and report defects and relegates personnel to entering binary status data on rework jobs through touch screen terminals. In the latter system, assembly status data is registered by scanning a bar code formed when two halves of an electrical connector are correctly joined. This technique, while undeniably ingenious, has an obviously limited range of applicability; and more importantly, neither of these systems make effective use of the perceptual capacities of the human operators involved in the manufacturing process.

Developments in an alternative direction have attempted to emphasize the advantages of human perception in testing and inspection operations. U.S. Pat. No. 5,086,397, for example, shows a system for collecting data through test and inspection stations where technicians identify and classify manufacturing defects and then enter appropriate data using optical styluses at display terminals. The entry process, however, requires the technician to advance incrementally through a hierarchy of classification menus and to encode substantial amounts of defect classification data through a 10-key numeric pad displayed on the terminal screen. Each defect datum entry therefore requires several manual steps and again depends on the accuracy of manual encoding. This system also does generate not production history information for individual production units, either, because it does not employ serial numbers to identify individual production units.

What the next generation of production information systems urgently needs, and what even the sophisticated systems discussed above do not provide, is a real-time data collection system that takes full advantage of data entry automation while not sacrificing the information quality afforded by human perception. Such a system should completely eliminate manual encoding of defect data while including human technicians to actually generate the data. Preferably, it would rely on existing information and data entry technologies and could be implemented in existing manufacturing facilities with only modest start-up expenses. Ideally, this system would provide reliable and flexible data collection with only minimal operating costs.

SUMMARY OF THE INVENTION

Accordingly, the present invention is directed to a quality control apparatus and method using a bar code data entry system that substantially obviates one or more of the problems due to limitations and disadvantages of the related art.

An object of the present invention is to provide a quality control system using a bar code system and a method of the same in which production particulars from a manufacturing process to a sending-out process are entered by using the bar code system and stored by SETs so as to prevent defective products from being sent out and avoid repetitive occurrences of the same failure, thereby improving the product's quality.

Another object of the present invention is to prevent errors occurring when information about a defective product is entered by installing a bar code system in a production line so as to collect the information in time and efficiently process it.

To achieve these and other objects, the present invention provides in a first aspect a production history apparatus comprising a system control computer, a bar code printer responsive to data signals generated by the system control computer, a plurality of failure code compilations, a plurality of bar code scanners, and a display device in communication with the system control computer. The system control computer is adapted to receive production data representative of a condition of each one of a plurality of production units at each one of a plurality of production stations in a manufacturing process.

The bar code printer is adapted to print, in response to data signals from the system control computer, a bar code upon each one of a plurality of bar code labels. Each one of the bar code labels corresponds to one of the production units, and the bar code printed upon the bar code label represents identification data including a production unit serial number corresponding to the production unit to which the bar code label corresponds. Each of the failure code compilations includes one or more failure bar codes, and each failure bar code represents and identifier corresponding to a predetermined one of a plurality of production failures. The plurality of bar code scanners includes a first group and a second group, with the first group including one or more bar code scanners adapted to scanning the bar codes printed upon the bar code labels and the second group including one or more bar code scanners adapted to scanning failure bar codes included in at least one of the failure bar code compilations.

The display device is adapted to display a production line stop signal when the system control computer generates a control signal indicating that a failure rate exceeds a predetermined reference value, with the failure rate corresponding to one of the plurality of production failures The memory device is adapted to store the production data.

The present invention provides in a second aspect a production history control method using a bar code data entry system. The method comprises a first step of printing upon each of a plurality of bar code labels a bar code, with each one of the bar code labels corresponding to one of a plurality of production units in a manufacturing process. The bar code printed on each bar code label represents identification data including a production unit serial number corresponding to the production unit to which the bar code label corresponds. The manufacturing process includes a plurality of production stations.

The method includes a further step of attaching to each one of the plurality of production units the bar code label corresponding to the production unit at a specified location. The method also includes the step of entering the identification data into a system control computer for each one of the production units by scanning the bar code of the bar code label attached to the production unit. The method includes a still further step of determining at each one of the plurality of production stations and for each one of the plurality of production units whether a production failure exists in the production unit and entering an identifier into the system control computer by scanning a failure bar code when the production failure is determined to exist in the production unit. The failure bar code thus scanned is representative of the identifier, and the identifier corresponds to the production failure.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of this invention, and many of the attendant advantages thereof, will be readily apparent as the same becomes better understood by reference to the following detailed description when considered in conjunction with the accompanying drawing figures, in which like reference symbols indicate the same or similar components, wherein:

FIG. 1A is an illustration of a rework data card for a typical quality control system;

FIG. 1B is an illustration of a history card for recording inspection and repair data according to such a system;

DETAILED DESCRIPTION OF PREFERRED EMBODIMENT

Figure 2B:
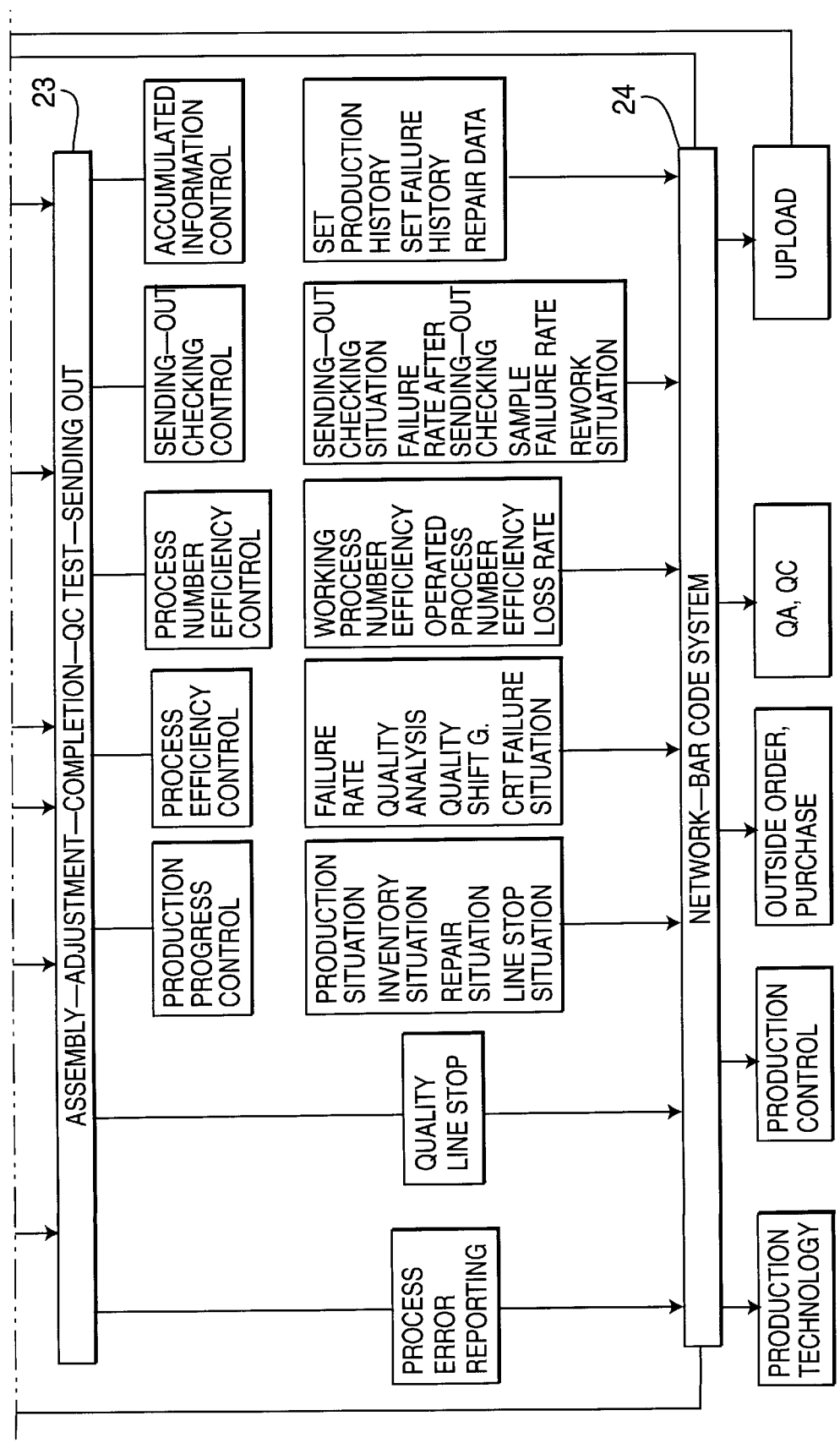
FIG. 2 (FIGS. 2A and 2B) is a hierarchical diagram of a quality control apparatus according to a preferred embodiment of the present invention.

FIG. 1A shows an example of a rework data card used in a typical quality control system. FIG. 1B depicts an exemplary history card for recording inspection and repair data as used in the typical system. The history card provides entries for serial and model numbers, operational test data, and defect correction data through manual recordation. Real-time collection and analysis of such production data is nearly impossible in this conventional technology that relies upon manual data entry. Actual data analysis to identify patterns and relationships in production defects can occur in such a system only after a substantial time delay.

The bar code system contemplated in the present invention has seen widespread use in a variety of contexts. In its essence, a bar code is a representation of alphanumeric characters by series of adjacent stripes of varying widths; that is, a special combination of bars and spaces. A bar code reader is used to enter the bar coded information into a computer system. The following brief description will suggest some of the advantages afforded by such a system as one component in a practical data input means for production defect information.

As a pattern of variations in visible-light reflectance, a bar code is relatively impervious to adverse environmental factors such as magnetic fields, extreme temperatures, and high humidity. It can be read without contact between the reader and the pattern substrate. The substrate (e.g., a label or tag) may consist of inexpensive and easily adaptable materials. Thus, bar code systems provide a convenient and effective means for collecting information wherever that information may be generated. In view of these advantages, bar codes have become a popular means for on-line collection of information in, for example, point of sale (POS) systems in supermarkets and department stores and point of production (POP) systems used by manufacturers of finished goods and parts.

Substantially all types of information amenable to processing by computers can be encoded in the form of bar codes. For example, identification numbers for individual units of production (such as model number, serial number, and so forth), output quantities, order codes, and prices may all be encoded as bar codes. Data encoded in one of these a special combination of bars and spaces is rapidly and accurately entered into a computer by means of a bar code reader. A decoder program converts the data from its bar code format into a standard electronic format for numerals, characters, and symbols, such as '0–9', 'A–Z', '.', '$', '/', '+', '%', 'SPACE' and the like. The data thus formatted for computer processing is entered in a main computer through a communications network via a typical system interface such as an RS-232C (or RS-422) port.

Bar code systems offer several advantages over other data input approaches. First, bar codes provide dramatic reductions in data entry error rates. A report on the LOGMARS PROJECT for the U.S. Department of Defense found that an example bar code system generated only four errors from 1,266,444 bar code entries, which represents an accuracy of 99.9997%. Thus, bar code systems have been proven to surpass all other data input systems for accuracy. Other data input systems have relatively high error rates of, for example, $\frac{1}{300}$ (99.7%) for keyboard entry and $\frac{1}{10,000}$ (99.99%) for OCR entry.

A second attractive feature of the bar code as data entry device is its simplicity. One or more characters, words or codes can be entered with a single motion of a pen scanner or a gun scanner. Moreover, the identical motion accurately enters any bar code, regardless of the content of the data encoded therein. Bar code systems therefore essentially eliminate the problem of data errors arising from encoding errors. This results because, in effect, a bar code constitutes a pre-encoded unit of data. Of course, accurate data collection still depends upon entry of the correct encoded data.

A third benefit of bar code systems derives from the format of data storage they employ. Bar codes represent information by a pattern of bars and spaces extending through a horizontal dimension. Thus, virtually all of the vertical extension of a bar code constitutes data redundancy. This data redundancy provides a robust protection against data loss, as may be observed from the fact that a typical bar code scanner can correctly read a damaged bar code even though the damage has obliterated up to 95% of the vertical extension of the bar markings. For OCR, to offer a contrasting example, accurate data entry is impossible with only 1% damage in any direction.

A detailed presentation of the preferred embodiments of the present invention will now be provided, examples of which are illustrated in the accompanying drawing figures. FIG. 2 (FIGS. 2A and 2B) provides a hierarchical diagram illustrating a data processing system including a bar code data entry system in accordance with the present invention. A server bar code system 22 receives production data such as production model specifications, work order (W/O) particulars and production plans from a host computer 21 that controls the entire data processing system.

Server bar code system 22 controls registration of basic information and issuance of failure code books, as well as generation of work orders, production plans, and work plans. Server bar code system 22 connects to a production control system 23 that performs production progress control, process quality control, process quantity efficiency control and sending-out (i.e., shipping and pre-shipping) checking control. Production control system 13, in turn, connects to a network bar code system 14 and thereby transmits information to the various production sections relating to production technology, work orders, and purchases.

The basic information whose registration is controlled by server bar code system 12 includes designated failure names (i.e., the reference designations assigned to identified production defects), a failure factor associated with each designated failure, duty process data, component inventory locations, and component supplier identification. The production and work planning controlled by server bar code system 22 include production planning according to specific fabrication and assembly processes, and work scheduling including work assignment by sections, attendance and excused absence accounting, and overtime planning.

Production control system 23 controls work flow information through several subsections. Production progress control monitors production status, inventory status, and rework status, as well as production line stop situations. Process quality control monitors defect rates, performs quality analysis, and assesses the status of defects. Process number efficiency control evaluates working process number efficiency, operated process number efficiency, and so forth. Sending-out checking control monitors sending-out (i.e., shipment and pre-shipment) inspection status, rejection rates downstream from the sending-out inspection process, and rework status.

Figure 3:
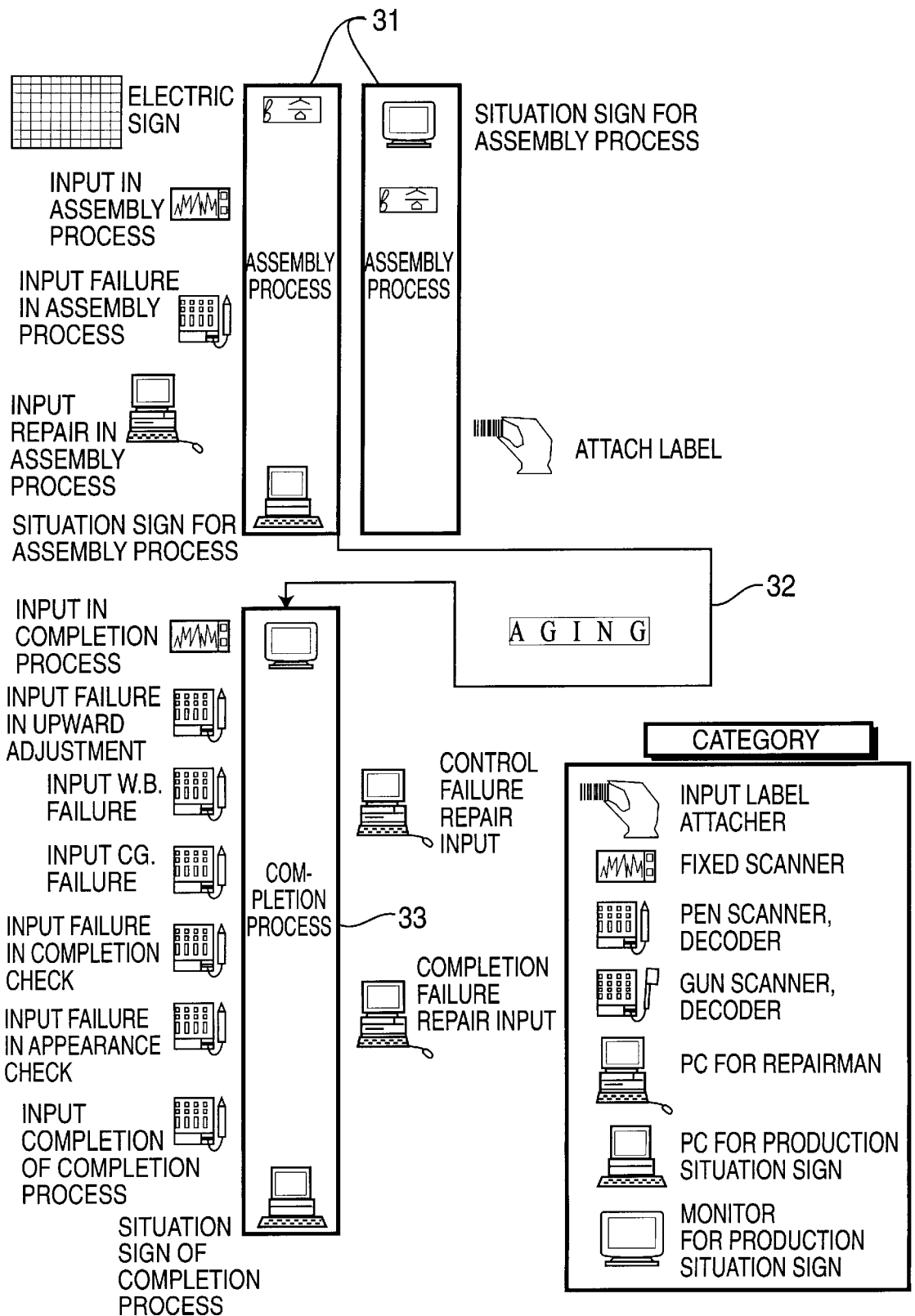
FIG. 3 is a block diagram illustrating assembly and inspection procedures incorporating the principles of the present invention.

FIG. 3 provides a block diagram illustrating the assembly and checking processes in the above production control system incorporating a quality control system in accordance with the present invention. An assembly process 31 includes preparation and attachment of input labels to identify individual production units, as well as data input operations arising during product assembly that include registration of assembly process initiation, identification of assembly errors, and registration of assembly defect repairs.

Assembled units must undergo a hot burn-in or aging process 32, which is a necessary step in the manufacture of electronic products to ensure the reliability of the product's constituent parts. The aging process amounts to an endurance test of production units in the presence of high temperature, high pressure, and other adverse conditions. After aging process 32, production units undergo a completion process 23 that includes a battery of operational tests. For example, in case of a display device, these tests might include an upward arbitration test, a white balance test, a perfection test, an appearance test, and so forth.

Upon identification of a test failure in completion process 23, an inspector records information specifying the test failure and the defective parts involved by means of a bar code scanner. This simple operation comprises consulting a list of failure bar codes, which may be compiled in a failure code book, to locate a failure bar code having an accompanying description or descriptive title corresponding to the identified test failure. The inspector then scans the appropriate code, thereby in one action rapidly and accurately entering machine-readable defect data ready for production analysis in real time.

Each one of the failure code books may be specially adapted to a specific assembly or test station and a specific production model and regularly updated to include newly-identified failure modes. Compilation of failure bar codes in these failure code books allows failure identifiers to be encoded in advance for as many different failure types as the technicians can conveniently distinguish. The system of the present invention therefore completely eliminates manual data encoding, replaces multi-step data entry procedures with a single, flowing operation, and simultaneously preserves the full range of defect differentiation provided by human perceptual capabilities.

Figure 4A:
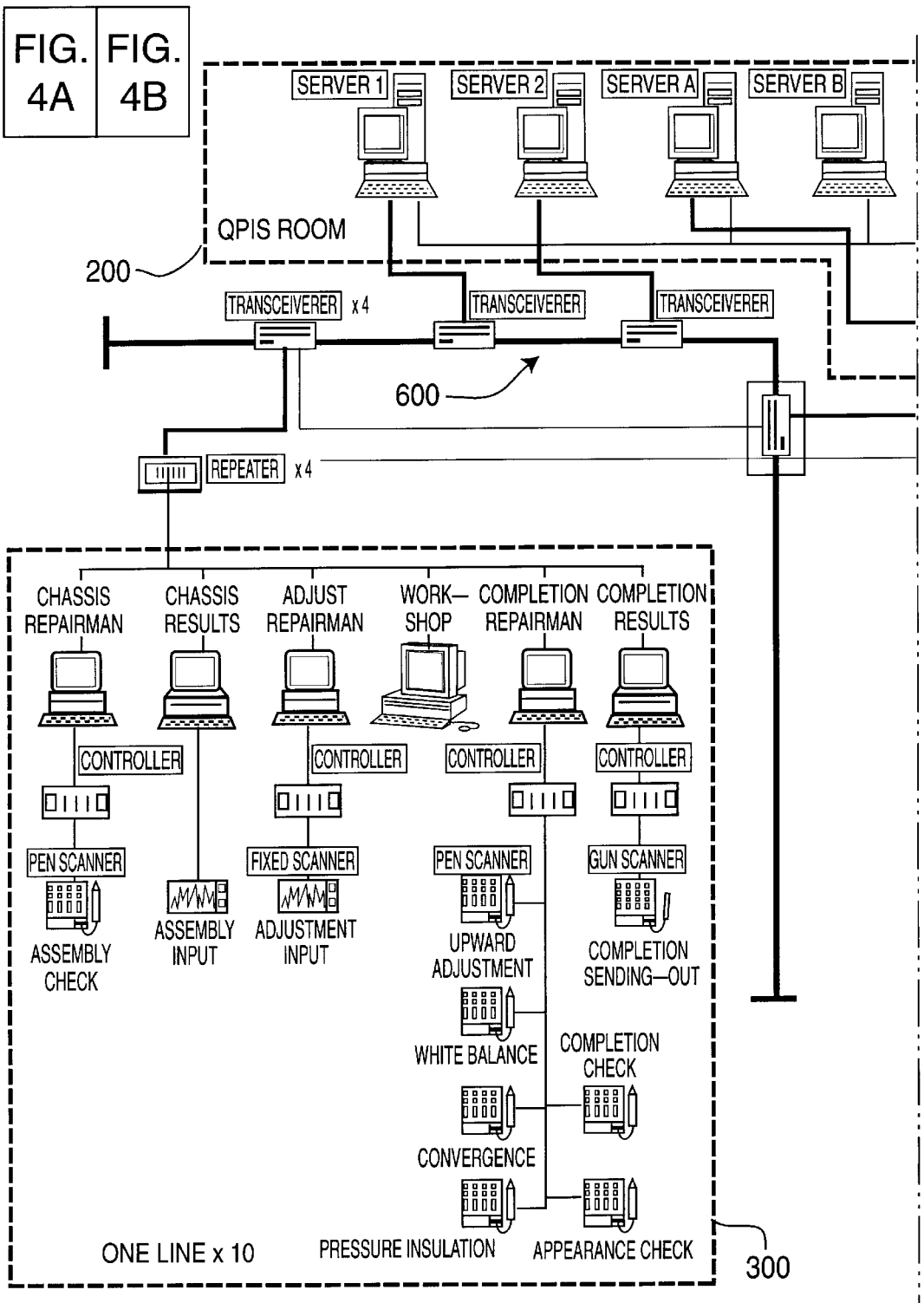
FIG. 4 (FIGS. 4A and 4B) is a block diagram showing an information network of a quality control apparatus using a bar code data entry system in accordance with the present invention.
Figure 4B:
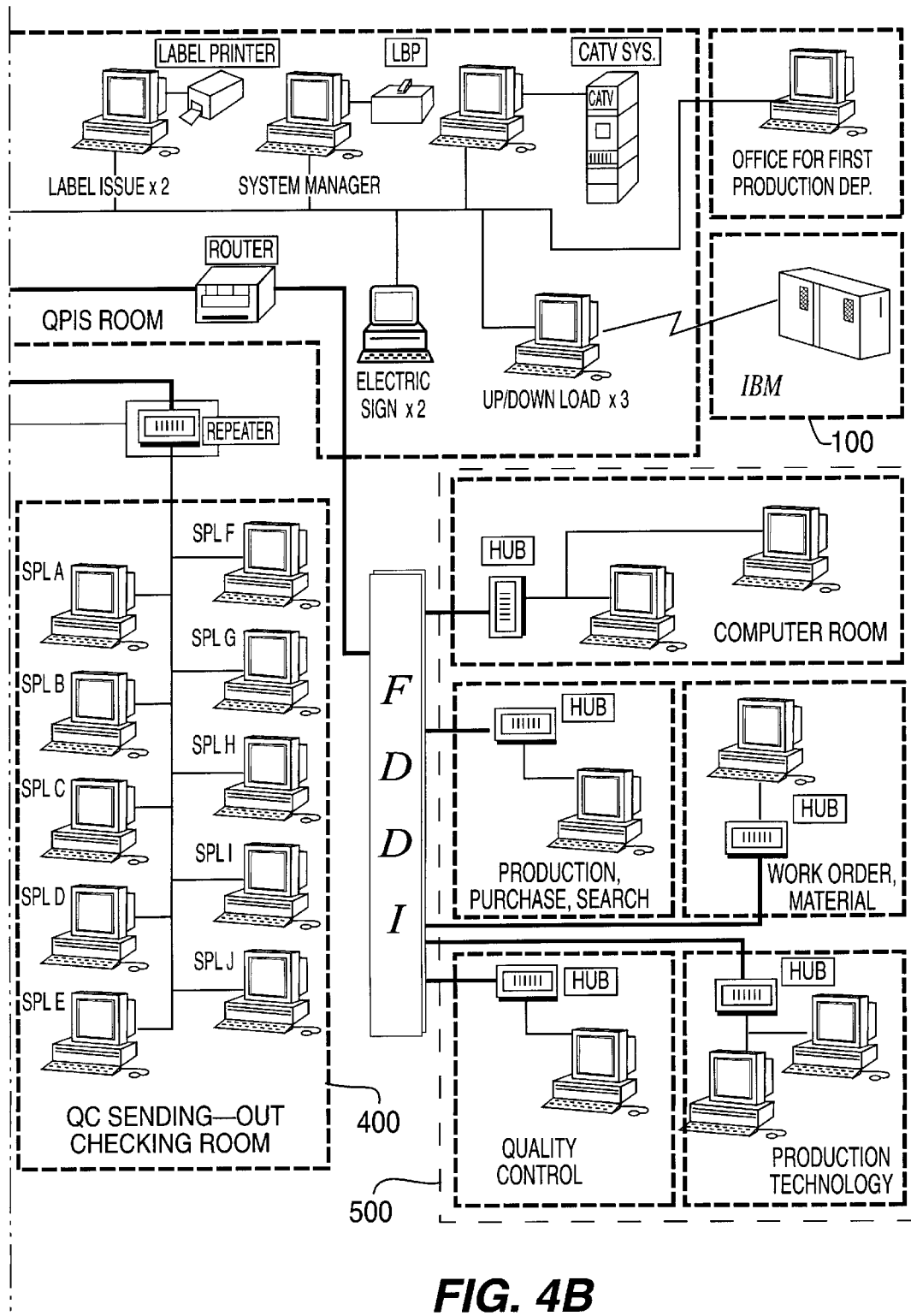

FIG. 4 (FIGS. 4A and 4B) shows an information network for a quality control system according to the present invention. This network comprises a system control computer 100 for processing information for all manufacturing process lines, as well as information about the overall status of production. A system control section 200 includes a plurality of server computers and a bar code label printer. A production section 300 generates information pertaining to production yields and defects occurring in the assembly process and enters this information into the system by means of bar code scanners. A quality control (QC) test section 400 performs quality tests of the production units manufactured in production section 300.

A production support section 500 provides technical support for production, purchase, quality control, work order and production processes through data communications with system control section 200. These data communications, conducted between the respective sections through a local area network (LAN) 600, enable real-time collection of production data and thus allow real-time generation of accurate production records. More importantly, real-time statistic analysis of this production data enables management to establish production plans reflecting the actual current status of production and to rapidly modify those plans in response to problems that become apparent only in the course of production.

Figure 5:
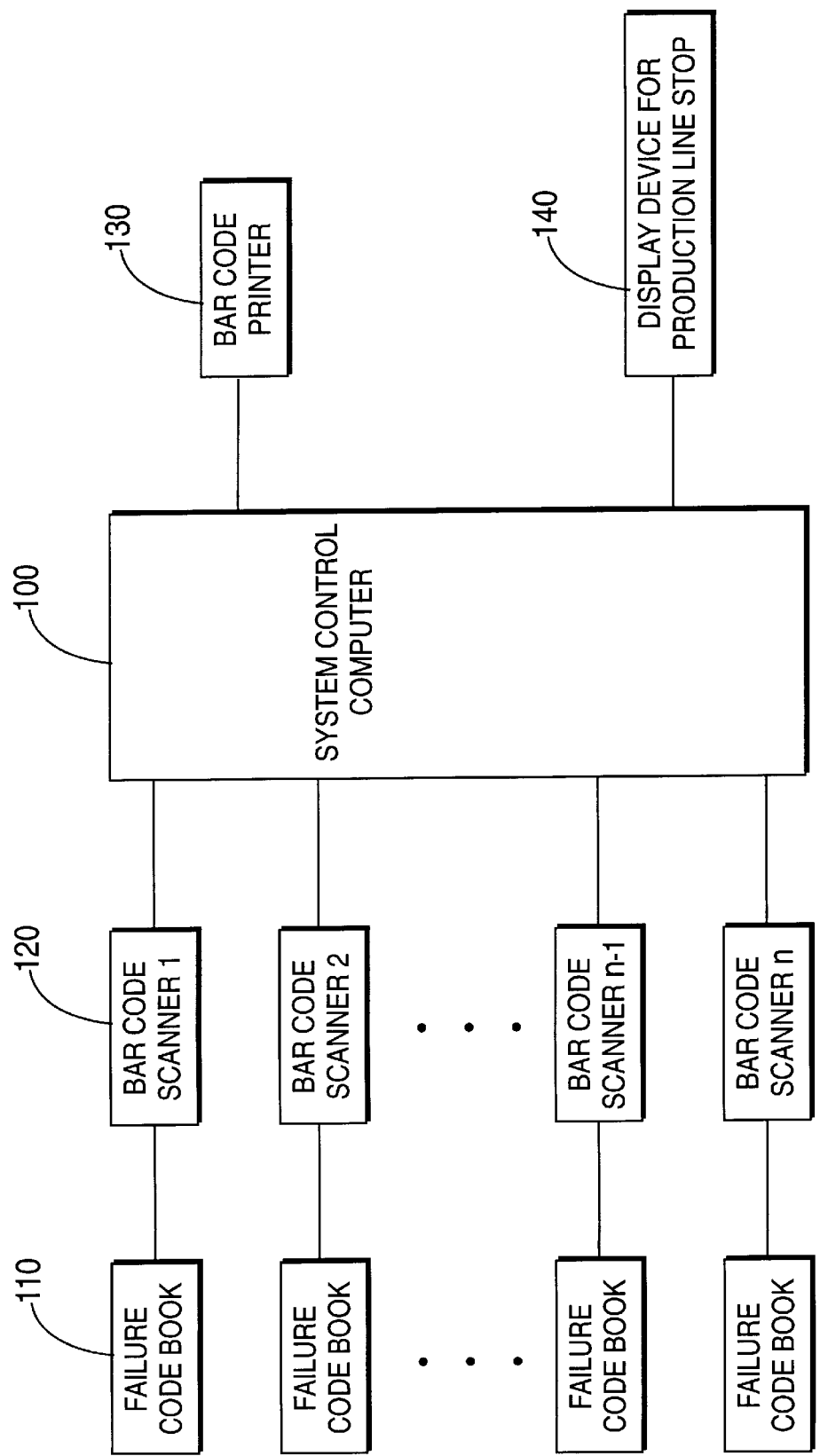
FIG. 5 is a block diagram showing in detail the production section of the quality control system of FIG. 4.

FIG. 5 provides a block diagram detailing the features of production section 300 of FIG. 4. System control computer 100 communicates with various parts of production section 300 in order to process data from all of the manufacturing process lines and to provide relevant information about the status of production. Production section 300 includes a bar code printer 130 for printing bar code labels to be affixed to individual production units as they enter the assembly process. Each label bears bar coded identification data for the production unit to which it is affixed, such as the model name of the product, model number, or serial number. System control computer 100 generates appropriate information for each bar code label and sends it to production section 300 for printing.

Also included in production section 300 is a plurality of failure code books 110, each of which typically contains a plurality of failure identification bar codes with accompanying descriptions or descriptive titles. These books may include bound volumes, looseleaf notebooks, flip charts, wall charts, or other suitable information organizing means to enable technicians in production section 300 to rapidly access the appropriate bar codes corresponding to failures they identify. The technicians employ a plurality of bar code scanners 120 for scanning into the computer system the production unit identification bar codes on the bar code labels attached to the units and for scanning failure codes from the failure code books when they identify failures.

A display device 140 receives signals from system control computer 100 and, in accordance with the signals, displays a production line stop signal to notify production personnel, either a line worker or a supervisor, when real-time analysis of the production data indicates that a defect rate for a particular defect exceeds a predetermined reference value. That is, system control computer 100 generates a control signal to activate the production line stop signal in accordance with the results of analysis performed upon the data entered into the system through the scanning of failure codes with bar code scanners 120. System control computer 100 stores production history information for each production unit in a memory device 150 as that information is generated in the processes of assembling the unit, checking it for quality control, and preparing it for shipment (the sending-out process).

Figure 6:
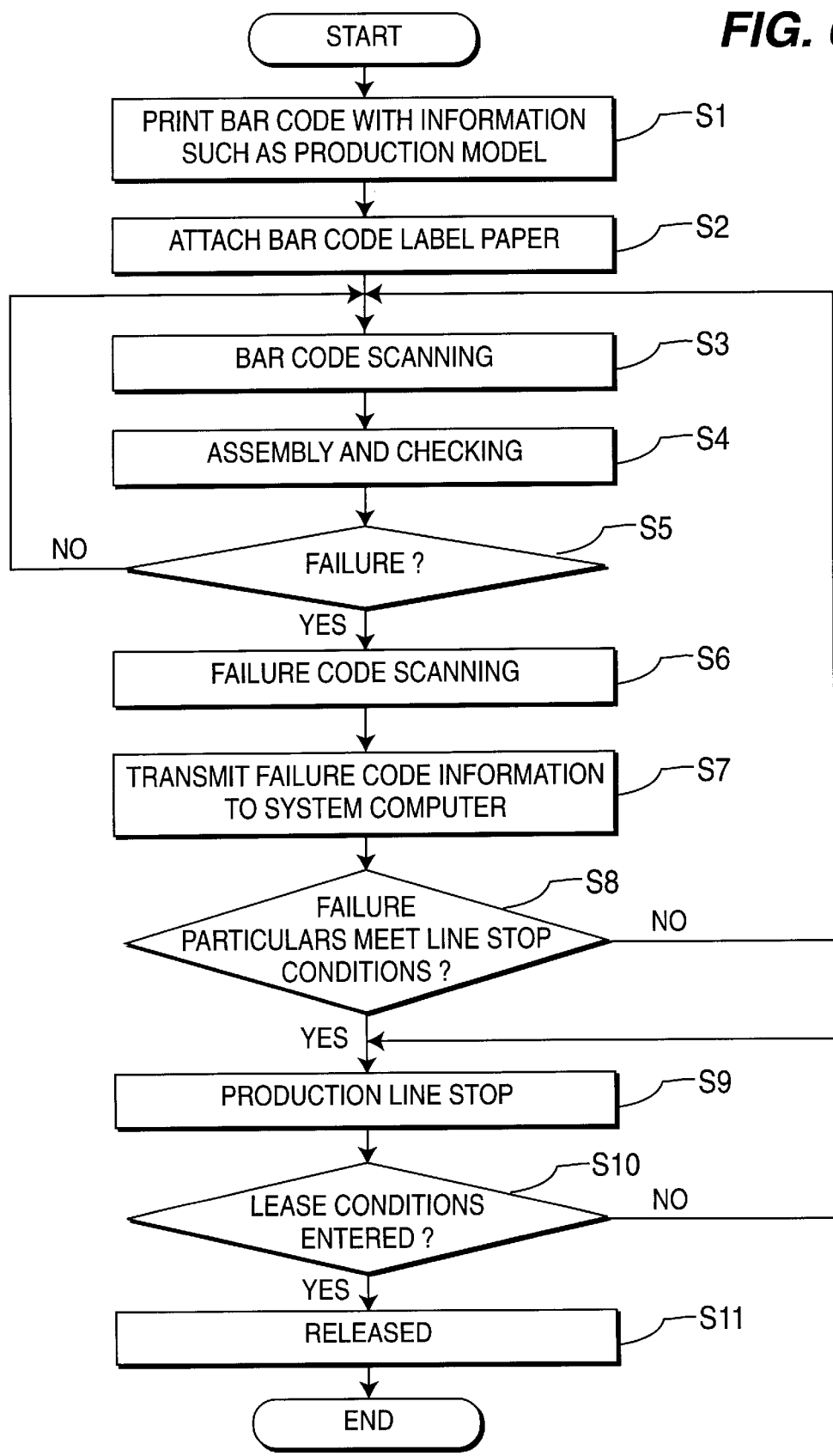
FIG. 6 is a flow chart illustrating a quality control method using a bar code data entry system according to the present invention.

A quality control method using a bar code data entry system as set forth above will now be described with reference to FIG. 6. System control computer 100 stores aggregate information about output goals, production plans, and inventory status as that information is received from each section. At step S1 bar code printer 130 prints bar coded identification labels for planned production units of each production model in accordance with information provided by system control computer 100 regarding the model an output goal for the model. This information is stored in memory device 150 at step S2 for each production unit of each model.

At step S3, each bar code label generated at step S1 is attached at a predetermined location to the production unit to which it corresponds. The labelled units are then transported, by means of a conveyor, to production personnel responsible for assembly and checking processes. At step S4 a fixed scanner, installed to aim at the path of the units on the conveyor at the assembly stage, automatically scans the bar code labels attached at the predetermined location to the production units undergoing assembly. Production data generated and entered into the system by bar code scanning in the course of the assembly and checking processes is transmitted at step S5 to system control computer 100 for each unit of a product model. This data is stored for each production unit in a designated production unit information storage region.

At step S6 production personnel variously assemble and check each production unit as brings it successively to the various production stations comprising the production process. As the unit arrives at an assembly or inspection station, for example, a worker uses a pen scanner or a gun scanner to scan the bar coded identification label attached to the unit. The data thus entered into the computer system are then transmitted to each section through LAN 600, whereby appropriate personnel can monitor production status information, such as what model is currently occupying a given production station and the number of units of a model currently under production.

Upon completing an assembly, checking, or other procedure, the worker at step S7 makes any failure determinations assigned to be performed at the production station at that point. The worker scans an appropriate bar code to enter the status of the production unit. If the procedure was completed normally for the unit, then at step S7 the worker scans a normal code and the flow of FIG. 6 returns to step S4 (where the production unit proceeds to the next successive station in the production line). Conversely, if a failure is detected at step S7, then at step S8 the worker scans an appropriate failure code from a failure code book 110. This information is also transmitted at step S9 to system control computer 100, which updates its databases of information on output results and failure data for the product model and the production unit.

In memory device 150 system control computer 100 stores information for individual production units of different models in production. At step S10, system control computer 100 determines, through real-time analysis of the stored production data, whether the occurrence rate for any given failure code satisfies a corresponding predetermined production line stop condition. If the failure rate exceeds a reference value predetermined for the product model and the failure condition, then at step S11 system control computer 100 generates a production line stop signal and thereby suspends further production. It should be noted that production personnel can also stop the production line manually, irrespective of line conditions, in case of a fatal failure or a serious problem that threatens safety on the production line.

Display device 140 displays a production line stop signal in accordance with system control computer 100's control signal or a manually entered stop request. The stop signal informs production personnel that a defect rate has exceeded its corresponding reference value or that another condition requiring suspension of the production line has developed. For example, if the product model is a display monitor, there may be specified reference values of three occurrences within two hours for circuit failures, five occurrences within two hours for apparatus failures, and six occurrences within two hours for circuit failures and apparatus failures together. Similarly, the production line may be suspended if the same failure occurs more than three times within a single day or more than one safety failure occurs in a day.

When a particular condition satisfies the production line stop criteria as described above, at step S11 an alarm or a warning image on one or more display screens announces the production line stop state. The production line stop signal is thereby brought to the attention of production personnel. Once a stop signal has been registered, the production cannot be restarted manually. A red or amber warning light flashes repeatedly, or an audible alarm sounds for a designated time period such as one minute. Production data ceases to be transmitted to system control computer 100. The system may be configured so that a stop condition cannot be cancelled until appropriate personnel confer to analyze the causes of the stop condition and to establish remedial measures.

At step S12 the system monitors appropriate inputs for a valid stop condition release command. Cancellation of the stop condition may require entry of various data at step S13, such as an excessive failure condition responsible for the suspension, a section responsible for the failure condition, personnel in charge when suspension occurred, and cancellation particulars. At step S14. when the system receives a valid cancellation command, the production line restarts automatically. Display device 140, which may be an electric sign or a large-sized monitor, is returned to a normal condition the warning light and the alarm are turned off. Entry of production data to system control computer 100 also resumes.

The unit-by-unit production histories for each product model also include data generated in pre-shipment and shipment processes. If a failure occurs at a packaging, conveying, or storing station, data regarding the failure are added to the production history file for the involved production unit. Thus, the production stations involved in the sending-out process are integrated into the system's real-time data collection network as are the other production stations.

The present invention as described above utilizes a bar code data entry system, integrated into the production lines, to collect highly reliable production defect data at the earliest possible stage in the production process. Real-time analysis of this data enables the system to suspend the production line immediately upon detecting an excessive rate of defects. The invention thereby minimizes repetitive occurrences of the same failure and prevents shipment of large numbers of production units containing the same defect.

It will be apparent to those skilled in the art that various modifications and variations can be made in the present quality control apparatus and method without departing from the spirit or scope of the invention. Thus, it is intended that the present invention cover such modifications and variations of this invention, provided only that they come within the scope of the appended claims and their equivalents.

What we claim is:

1. A quality control apparatus using a bar code data entry system, said apparatus comprising:

a system control computer adapted to receiving production data representative of a condition of each one of a plurality of production units at each one of a plurality of production stations in a manufacturing process;

a bar code printer responsive to data signals generated by said system control computer and adapted to printing in response thereto upon each one of a plurality of bar code labels a bar code, with each one of said bar code labels corresponding to one of said plurality of production units, with said bar code for said bar code label representing identification data including a production unit serial number corresponding to said production unit;

a plurality of failure code compilations, with each failure code compilation including one or more failure bar codes and with each one of said failure bar codes representing an identifier corresponding to a predetermined one of a plurality of production failures;

a plurality of bar code scanners including a first group and a second group, with said first group including one or more bar code scanners adapted to scanning said bar codes printed upon said bar code labels, and with said second group including one or more bar code scanners adapted to scanning said failure bar codes included in at least one of said failure code compilations; and a display device in communication with said system control computer and adapted to display a production line stop signal when said system control computer generates a control signal indicating that a failure rate exceeds a predetermined reference value, with said failure rate corresponding to one of said plurality of production failures.

2. The apparatus of claim 1, wherein said system control computer is further adapted to:

generate from said production data a plurality of production histories, with each one of said production histories corresponding to one of said plurality of production units;

perform production analysis upon said plurality of production histories to identify a recurrent pattern of production failures arising in said manufacturing process; and generate production status data from said plurality of production histories.

3. The apparatus of claim 2, wherein said system control computer is further adapted to perform said production analysis in real time.

4. The apparatus of claim 3, wherein at least one of said plurality of bar code scanners is a pen scanner.

5. The apparatus of claim 2, wherein each one of said plurality of production histories includes for each one of said plurality of production stations quality control data corresponding to said production station, with said quality control data indicating whether a specified one or more of said plurality of production failures was reported from said production station, and with said quality control data including for each one of said specified production failures reported from said production station an identifier corresponding to said production failure and indicating a date upon which said production failure was reported when said quality control data indicates that said production failure was reported from said production station.

6. The apparatus of claim 1, wherein said display device includes a warning light.

7. The apparatus of claim 1, wherein said plurality of failure code compilations are failure code books.

8. A quality control method using a bar code data entry system said method comprising the steps of:

printing upon each one of a plurality of bar code labels a bar code, with each one of said bar code labels corresponding to one of a plurality of production units in a manufacturing process comprising a plurality of production stations, and with said bar code of said bar code label representing identification data including a production unit serial number corresponding to said production unit;

attaching to each one of said production units said bar code label corresponding to said production unit at a specified location on said production unit;

entering said identification data into a system control computer for each one of said production units by scanning said bar code of said bar code label corresponding to said production unit;

determining at each one of said plurality of production stations and for each one of said plurality of production units whether production failure exists in said production unit and entering an identifier into said system control computer by scanning a failure bar code when said production failure is determined to exist in said production unit, with said failure bar code representative of said identifier and with said identifier corresponding to said production failure;

compiling a plurality of production histories, with each one or said plurality of production histories corresponding to one of said production units and including for each one of said plurality of production stations quality control data corresponding to said production station, with said quality control data indicating whether a specified one or more of said plurality of production failures was reported from said production station, and with said quality control data including for each one of said specified production failures reported from said production station an identifier corresponding to said production failure and indicating a date upon which said production failure was reported when said quality control data indicates that said production failure was reported from said production station;

determining for each one of a plurality of production failures a failure rate of said plurality of production units corresponding to said production failure;

comparing for each one of said plurality of production failures said failure rate corresponding thereto with a predetermined reference value corresponding to said production failure; and generating a production line stop signal when said failure rate corresponding to at least one of said plurality of production failures exceeds said predetermined reference value.

9. The method of claim 8, wherein said identification data entering step is performed for each one of said production units by scanning said bar code of said bar code label with a fixed scanner.

10. The method of claim 8, wherein said scanning of said failure bar code is performed with a pen scanner.

11. A quality control method using a bar code data entry system, said method comprising the steps of:

printing upon each one of a plurality of bar code labels a bar code, with each one of said bar code labels corresponding to one of a plurality of production units in a manufacturing process comprising a plurality of production stations, and with said bar code of said bar code label representing identification data including a production unit serial number corresponding to said production unit;

attaching to each one of said production units said bar code label corresponding to said production unit at a specified location on said production unit;

entering said identification data into a system control computer for each one of said production units by scanning said bar code of said bar code label corresponding to said production unit;

determining at each one of said plurality of production stations and for each one of said plurality of production units whether production failure exists in said production unit and entering an identifier into said system control computer by scanning a failure bar code when said production failure is determined to exist in said production unit, with said failure bar code representative of said identifier and with said identifier corresponding to said production failure;

determining for each one of a plurality of production failures a failure rate of said plurality of production units corresponding to said production failure;

comparing for each one of said plurality of production failures said failure rate corresponding thereto with a predetermined reference value corresponding to said production failure; and generating a production line stop signal when said failure rate corresponding to at least one of said plurality of production failures exceeds said predetermined reference value.

12. The method of claim 11, wherein said identification data entering step is performed for each one of said production units by scanning said bar code of said bar code label with a fixed scanner.

13. The method of claim 11, wherein said scanning of said failure bar code is performed with a pen scanner.

* * * * *